(12) United States Patent
Morin et al.

(10) Patent No.: US 11,176,866 B2
(45) Date of Patent: Nov. 16, 2021

(54) IMAGE PROCESSING METHOD BASED ON PERIPHERAL REDUCTION OF CONTRAST

(71) Applicant: INTERDIGITAL CE PATENT HOLDINGS, Paris (FR)

(72) Inventors: Thomas Morin, Saint Gregoire (FR); Sebastien Fraleu, Noyal sur Vilaine (FR); Goulven Querre, Noyal sur Vilaine (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 49 days.

(21) Appl. No.: 16/413,550

(22) Filed: May 15, 2019

(65) Prior Publication Data

US 2019/0355292 A1 Nov. 21, 2019

(30) Foreign Application Priority Data

May 15, 2018 (EP) .................................... 18305596

(51) Int. Cl.
  *G09G 3/20* (2006.01)
  *G09G 3/36* (2006.01)
  *G09G 5/10* (2006.01)

(52) U.S. Cl.
  CPC .......... *G09G 3/2003* (2013.01); *G09G 3/3611* (2013.01); *G09G 5/10* (2013.01);
  (Continued)

(58) Field of Classification Search
  CPC ............. G06F 3/14; G06T 2207/10016; G06T 2207/10024; G06T 5/008; G06T 5/40;
  (Continued)

(56) References Cited

U.S. PATENT DOCUMENTS

2004/0254716 A1 12/2004 Ino et al.
2012/0105505 A1 5/2012 Wei et al.
(Continued)

FOREIGN PATENT DOCUMENTS

EP 2148318 A2 1/2010
JP 5761359 B2 8/2015
(Continued)

OTHER PUBLICATIONS

Peli, E., "Contrast in Complex Images", Journal of the Optical Society of America A, vol. 7, No. 10, Oct. 1990, pp. 2032-2040.

*Primary Examiner* — Kenneth Bukowski
(74) *Attorney, Agent, or Firm* — Patricia A. Verlangieri (57) ABSTRACT

An object of the invention is to avoid or at least limit the aforementioned drawback by a specific processing of video images to display, notably on large size screens. For this purpose, a method for processing at least one image of a video sequence is described. The method includes defining at least two peripheral areas $P_L$, $P_R$ in the at least one image, and reducing contrast of pixels in the defined peripheral area(s) having a local contrast $R_L$ and/or $R_D$ above a local contrast threshold $R_{th}$, or reducing contrast of pixels in subregions 1, 2, ..., i, ..., N of these defined peripheral areas having a local contrast $R_i$, $R'_i$ above a local contrast threshold $R_{i-th}$.

13 Claims, 8 Drawing Sheets

(52) U.S. Cl.
CPC ............ *G09G 2320/0247* (2013.01); *G09G 2320/0266* (2013.01); *G09G 2320/0276* (2013.01)

(58) Field of Classification Search
CPC ... G09G 2310/0232; G09G 2320/0247; G09G 2320/0266; G09G 2320/0276; G09G 2320/066; G09G 2320/0686; G09G 2360/16; G09G 3/20; G09G 3/2003; G09G 3/3611; G09G 5/10
See application file for complete search history.

(56) References Cited

U.S. PATENT DOCUMENTS

| | | |
|---|---|---|
| 2015/0163396 A1 | 6/2015 | Kudo et al. |
| 2018/0068425 A1* | 3/2018 | Guillotel ................... G06T 3/40 |

FOREIGN PATENT DOCUMENTS

| | | |
|---|---|---|
| KR | 1461995 B1 | 11/2014 |
| WO | WO2006003604 A1 | 1/2006 |

* cited by examiner

Low contrast $L_{1090}$ = 23% $L_{100\%}$
Horizontal Mean (μ) : 198
Horizontal Median : 199
StandardDev: 25
10%: 173
90%: 233
Total pixels: 1,068.925
VerticalMean: 4175
VerticalSigma: 7229

IMAGE PROCESSING METHOD BASED ON PERIPHERAL REDUCTION OF CONTRAST

REFERENCE TO RELATED EUROPEAN APPLICATION

This application claims priority from European Patent Application No. 18305596.1, entitled "IMAGE PROCESSING METHOD BASED ON PERIPHERAL REDUCTION OF CONTRAST", filed on May 15, 2018, the contents of which are hereby incorporated by reference in its entirety.

TECHNICAL FIELD

The invention relates to the reduction of flickering of images in the peripheral region of the eyes.

BACKGROUND ART

In the context of foveal-peripheral vision, the temporal response of the Human Visual System (HVS) is not homogeneous across the visual field of the human eye. In terms of motion responsiveness of the eye, the peripheral region of the retina is known to be more sensitive to moving targets than the fovea region.

The HVS response to spatial and temporal variations is commonly described by spatio-temporal Contrast Sensitivity Functions (CSF) which generally peak at certain spatial and temporal frequencies.

For a given flickering light source (size, average luminance, spectral wavelength distribution), its flickering has a temporal frequency which leads to a stable perception by the fovea or the peripheral region of the eye. This temporal frequency is well known as the Critical Flicker Frequency (CFF). This critical frequency is known to increase with retinal eccentricity. As a whole, it means that the flickering sensitivity of the human eye increase with its field of view (FOV). Therefore, a large screen of a TV display device or a near-eye display is more likely to cause flicker.

Figure 1:
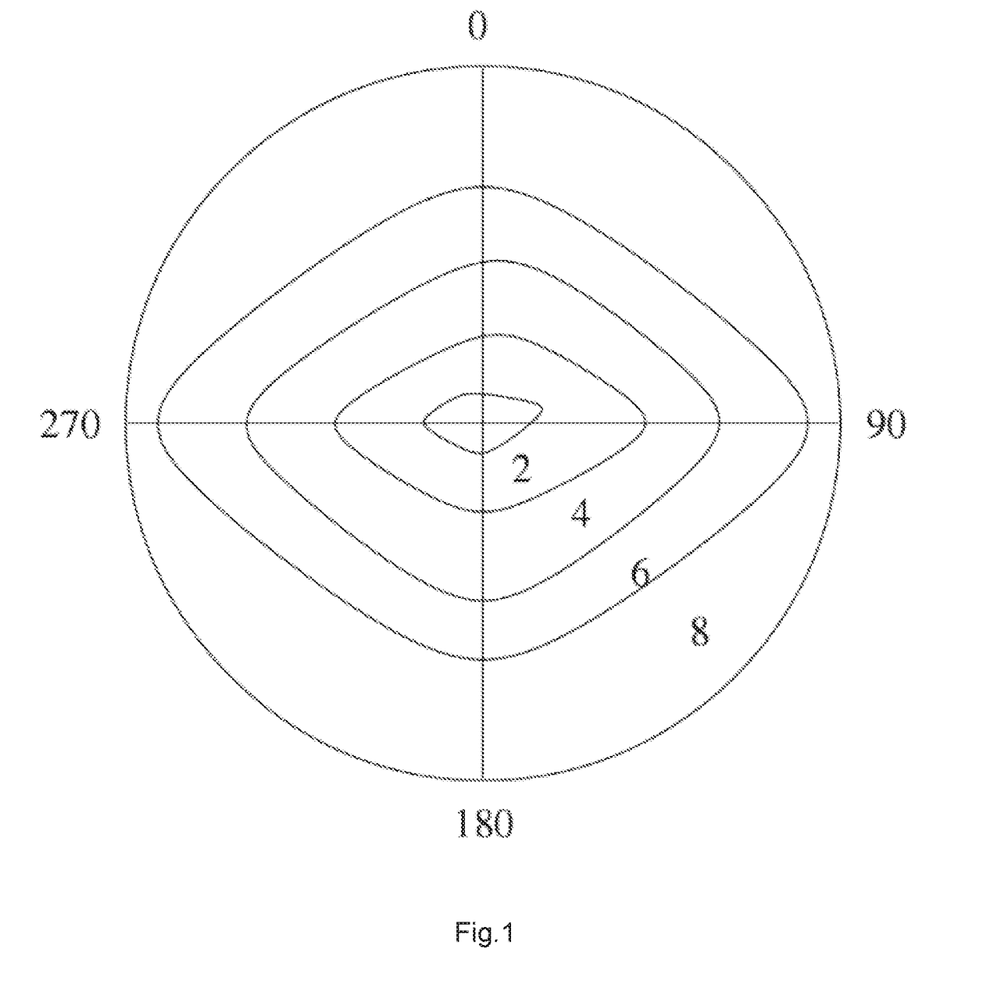
FIG. 1 shows threshold flicker isograms of the distribution of directional motion responsiveness of the human eye.

Moreover, the directional motion responsiveness of the eye is distributed as illustrated on FIG. 1, which shows threshold flicker isograms.

Figure 2:
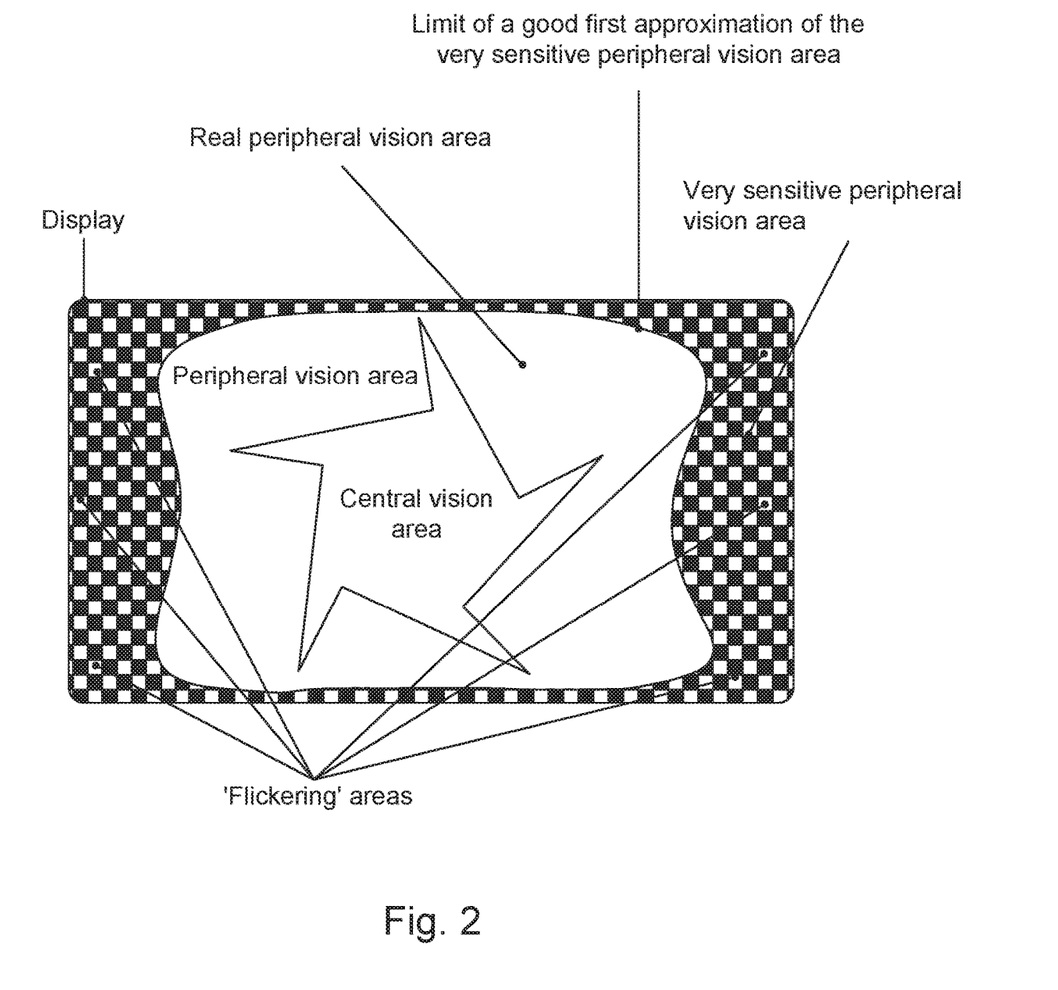
FIG. 2 shows a peripheral area of a screen that will likely create flicker in the corresponding peripheral vision area of the retina, distinct from a central area of this screen that will create no flicker on corresponding central vision area of the retina.

FIG. 2 illustrates a global consequence of these flicker isograms: a peripheral area of a screen that will likely create flicker in the corresponding peripheral vision area of the retina (therefore referenced as "flickering areas" on the figure), distinct from a central area of this screen that will create no flicker on corresponding central vision area of the retina.

This problem is more critical today because screens of large size are more widely used.

SUMMARY OF INVENTION

An object of the invention is to avoid or at least limit the aforementioned drawback by a specific processing of video images to display, notably on large size screens.

For this purpose, the subject of the invention is a method for processing at least one image of a video sequence comprising:

defining at least two peripheral areas $P_L$, $P_R$ in the at least one image, reducing contrast of pixels in the defined peripheral area(s) having a local contrast $R_L$ and/or $R_D$ above a local contrast threshold $R_{th}$ or reducing contrast of pixels in subregions 1, 2, ..., i, ..., N of these defined peripheral areas having a local contrast $R_i$, $R'_i$ above a local contrast threshold $R_{i-th}$.

Any known method of evaluation of local contrast can be used, notably method based on luminance of pixels in the sub-regions. See notably the article entitled "Contrast in complex images", by Eli Peli, published in October 1990, in J. Opt. Soc. Am. A, Vol. 7, No 10, p.2032-2040.

Preferably, said local contrast threshold $R_{th}$ is proportional to the width of a screen of a display device used to view said at least said image.

Preferably, reducing contrast of pixels is performed such that the largest pixel luminance values of said pixels are decreased and the smallest pixel luminance values of said pixels are increased.

Preferably, when the method comprises reducing contrast of pixels in subregions 1, 2, ..., i, ..., N of the defined peripheral areas having a local contrast $R_i$, $R'_i$ above a local contrast threshold $R_{i-th}$, local contrast threshold $R_{i-th}$ of each subregion i decreases monotonically in function of a distance of a center of this subregion i from a medium vertical straight line centered on the at least one image or from a center of the at least one image.

Having a contrast reduction increasing with eccentricity of the subregion within the at least one image will advantageously compensate for the known increase of Critical Flicker Frequency with retinal eccentricity.

Preferably, said peripheral areas are defined such as to be symmetrically distributed between a left part and a right part of the image.

Preferably, the local contrast of a peripheral area or of a subregion is based on a ratio defined as:

the difference $L_{1090}$ between the lowest luminance of the last decile of the distribution of luminance values of pixels of this peripheral area or subregion and the highest luminance of the first decile of this distribution, divided by the difference $L_{100\%}$ between the highest luminance and the lowest luminance of this distribution, wherein the last decile corresponds to the highest luminance values of the distribution and the first decile corresponds to the lowest luminance values of the distribution.

Preferably, the local contrast of peripheral area or a subregion of the at least one image is defined as said ratio multiplied by the standard deviation $\sigma_i$ of luminance values of pixels of the subregion.

The subject of the invention is also a method for displaying at least one image on a screen of a display device, comprising:

processing said image according to the above method,
displaying said image on said screen,
wherein said local contrast threshold $R_{th}$, $R_{i-th}$ is proportional to the width of said screen.

The subject of the invention is also an image processing device comprising at least one processor configured for implementing the above processing method.

The subject of the invention is also a computable non-transitory readable storage medium comprising stored instructions that when executed by a processor performs the above processing method.

BRIEF DESCRIPTION OF DRAWINGS

The invention will be more clearly understood on reading the description which follows, given by way of non-limiting example and with reference to the appended figures in which.

DESCRIPTION OF EMBODIMENTS

A first embodiment of the method for processing images of a video sequence will now be described in reference to FIG. 9, in the context of displaying these images on a screen of a display device, having a width L and a height H.

Images of the video sequence are all defined in a same geometrical format, here a rectangular format delimited by a top and a bottom horizontal side of width L and a left and a right vertical side of height H. The horizontal sides are larger than the vertical sides.

In a first step of this first embodiment, peripheral areas of images are defined, preferably at least one peripheral area $P_L$ on the left side and at least one peripheral area $P_R$ on the right side.

Figure 3:
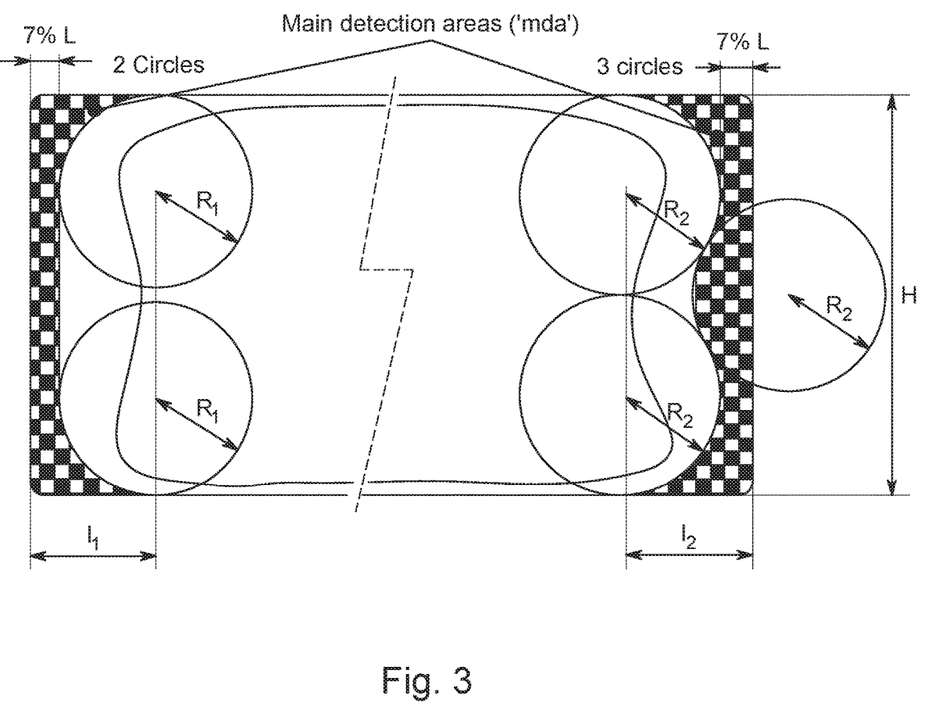
FIG. 3 illustrates a first and a second variant of defining peripheral areas in an image in the first step of the first and second embodiment of the image processing method.

In a first variant of this first step illustrated on the left part of FIG. 3, the inner border of this peripheral area is anchored on four circles of radius $R_1$ that are disposed symmetrically in reference to the center of the image, each tangent to a horizontal side of the image and centered at a given distance $I_1 > R_1$ from a lateral side of the image. As shown on FIG. 3, typically $R_1 \leq H/2$ and $I_1 - R_1 = 7\% \, L$.

In this variant, the inner border of the peripheral area is defined as an outer envelope of the four circles with straight lines between the circles, and the outer border of the peripheral area corresponds to the outer border of the image.

As defined in this first variant, the left peripheral area $P_L$ and the right peripheral area $P_R$ are disconnected. These peripheral areas of images of width L and height H are then defined such that, for any pixel x,y of this area, we then have:

$$\forall y \in [0, R_1], x \leq \sqrt{R_1^2 - (y - I_1)^2} + I_1$$

$$\forall y \in [R_1, H - R_1], x \leq 0.07*L \text{ ou } x \geq 0.93*L$$

$$\forall y \in [H - R_1, H], x \leq \sqrt{R_1^2 - (y - (H - R_1))^2} + I_1$$

In a second variant illustrated on the right part of FIG. 3, the inner border of this peripheral area is anchored on six circles of radius $R_2$ that are disposed symmetrically in reference to the center of the image, four of which are tangent to a horizontal side of the image and centered at a given distance $I_2 > R_2$ from a lateral side of the image, and two of which are equidistant from the two horizontal sides and tangent to two of the four other circles. As shown on FIG. 3, typically $R_2 = H/2$ and $I_2 - R_2 = 7\% \, L$.

In this variant, the inner borders of the peripheral areas are defined as an outer envelope of the four circles and an inner envelope of the two circles, and the outer border of the peripheral areas correspond to the outer border of the image.

As defined in this second variant, the left and right peripheral areas are also disconnected. The peripheral areas of images of width L and height H are then defined such that, for any pixel x,y of this area, we then have:

$$\forall y \in [0, R_2], x \leq \sqrt{R_2^2 - (y - L_1)^2} + L_1$$

$$\forall y \in [R_2, H - R_2], x \leq 0.07*L \text{ or } x \geq 0.93*L$$

$$\forall y \in [H - R_2, H], x \leq \sqrt{R_2^2 - (y - (H - R_2))^2} + L_1$$

Figure 4:
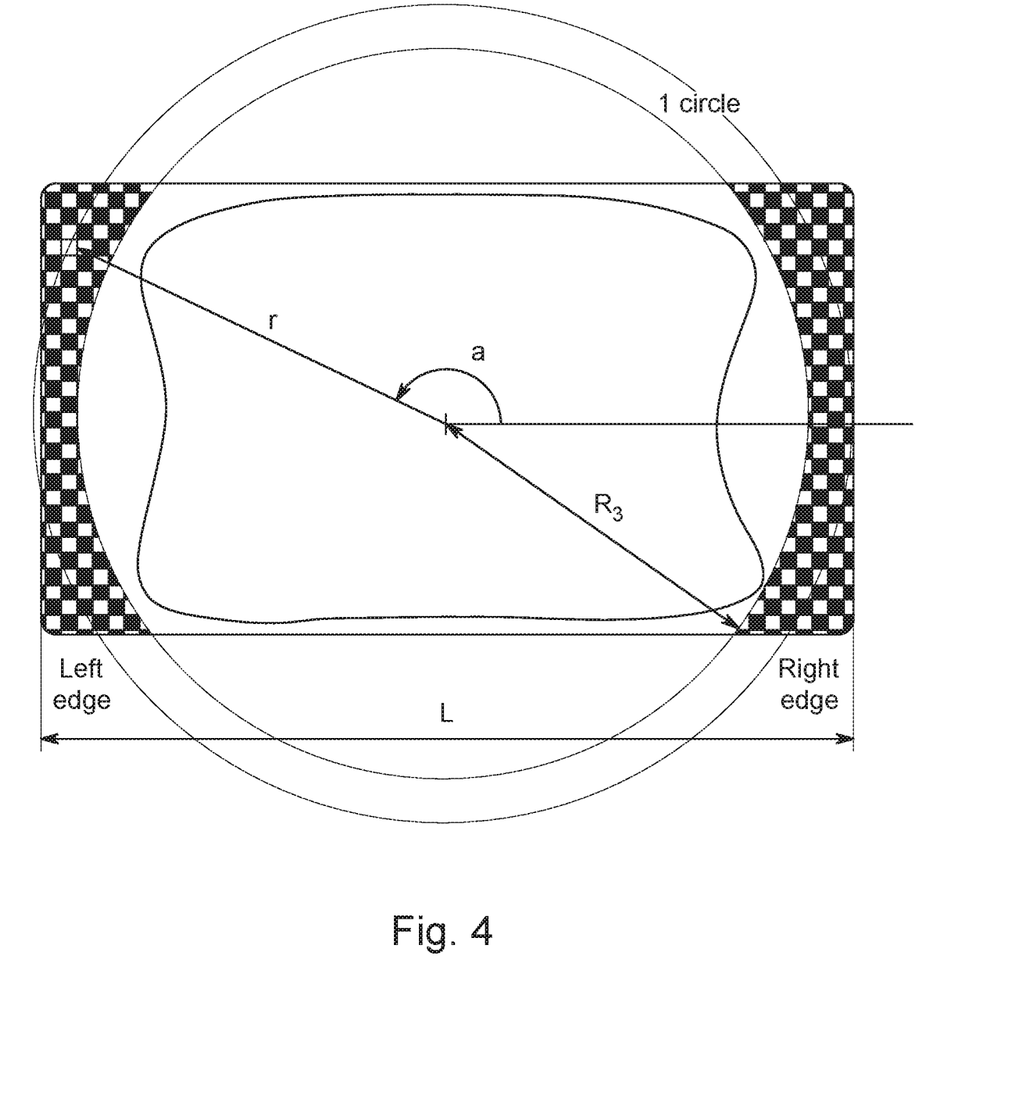
FIG. 4 illustrates a third variant of defining peripheral areas in an image in the first step of the first and second embodiment of the image processing method.

In a third variant illustrated on FIG. 4, the inner border of the peripheral areas is defined as a circle of radius $H/2 < R_3 < L/2$ centered on the center of the image, and its outer border corresponds to the outer border of the image.

Therefore, for any pixel x,y belonging to peripheral areas of the images of width L and height H, we have:

$$\forall (x,y) x \leq L, y \leq H, \sqrt{(L/2 - x)^2 + (H/2 - y)^2} \leq R_3$$

In this variant, the left and right peripheral areas are also disconnected. These two parts are disconnected because $R_3 > H/2$. This third variant is advantageous because it requires less computational resources.

In a fourth variant, the inner border of the peripheral area is defined as a rectangle centered on the center of images, of width L.(1−2k), of height H corresponding the height of the image, where, for instance k=20%. In this variant, the left and right peripheral areas are also disconnected.

Therefore, for any pixel x,y belonging to peripheral areas of images of width L and height H, we have:

$$\forall y \in [0, H], x \leq 0.2*L \text{ ou } x \geq 0.8*L,$$

In a second step of the first embodiment, local contrast values are computed at least in the peripheral areas defined in the first step.

For such a computing, any known method of evaluation of local contrast can be used, notably a method based on luminance of pixels in the sub-regions. See notably the article entitled "Contrast in complex images", by Eli Peli, published in October 1990, in J. Opt. Soc. Am. A, Vol. 7, No 10, p.2032-2040.

Luminance value of a pixel is calculated in a manner known per se from its color, notably from its RGB values. These luminance values are for instance within the whole interval $[0, 2^{p-1}]$, where p is the number of digits under which color values of pixels are coded.

Luminance value of a pixel $p_j$ is for instance computed according to the well-known following formula:

$$L_j = 0.3*R_j + 0.59*G_j + 0.11*B_j$$

with $Max(R_j) = Max(G_j) = Max(B_j) = Max(L_j) \leq 2^p$ where $R_j, G_j, B_j$ are the RGB components of the color of this pixel $p_j$.

The local contrast value $R_L, R_D$ of a peripheral area $P_L, P_R$ is for instance based on a ratio defined as:

the difference $L_{1090}$ between the lowest luminance of the last decile of the distribution of luminance values of all pixels of this peripheral area $P_L$, $P_R$ and the highest luminance of the first decile of this distribution, divided by the difference $L_{100\%}$ between the highest luminance and the lowest luminance of this distribution, wherein the last decile corresponds to the highest luminance values of the distribution and the first decile corresponds to the lowest luminance values of the distribution.

In a first variant, this local contrast value is equal to this ratio.

In a second variant, this local contrast value is equal to this ratio multiplied by the standard deviation $\sigma_L$, $\sigma_R$ of luminance values of all pixels of the peripheral area.

This standard deviation $\sigma_L$ of the left peripheral area $P_L$ can be typically computed as:

$$\sigma_L = \sqrt[2]{\left(\sum_{j=1}^{j=N_L}(L_j-\mu_j)^2\right)/N_j}$$

where $N_L$ is the total number of pixels in the left peripheral area $P_L$, $L_j$ is the luminance of a pixel $p_j$ of this peripheral area, $\mu_j$ is the average luminance over all pixels of this peripheral area. The standard deviation $\sigma_R$ of the right peripheral area $P_R$ is defined accordingly.

In a third step of the first embodiment, local contrast values $R_L$, $R_D$ computed from the second step for each peripheral area $P_L$, $P_R$ are compared to a local contrast threshold $R_{th}$, for instance equal to 0.5. If $R_L$ and/or $R_D > R_{th}$, then the result of the comparison is positive, and if $R_L$ and/or $R_D \leq R_{th}$, the result of the comparison is negative. The value of the local contrast threshold $R_{th}$ is set such that a positive result of the comparison means a significant risk of flickering in the eyes of a viewer viewing the image on the screen of the display device, and that a negative result of the comparison implies practically no risk of such a flickering in the eyes of a viewer. This value of the local contrast threshold $R_{th}$ can be set using any adapted testing of such a flickering. As the risk of such a flickering is proportional to the width of the screen, the set value of the local contrast threshold $R_{th}$ is preferably proportional to the width of the screen.

In a fourth step of the first embodiment, the local contrast of the peripheral area $P_L$ and/or $P_R$ that get a positive result of comparison at the third step is reduced.

This reduction of local contrast can be performed by applying any well-known contrast reduction filter to the peripheral area(s) $P_L$ and/or $P_R$ having a positive result of comparison. As a first variant, a digital neutral density filter may be used to reduce the contrast. As a second preferred variant, the reduction of local contrast in a peripheral area is performed such that the largest pixel luminance values of pixels of this peripheral area are decreased and the smallest pixel luminance values are increased.

Figure 5:
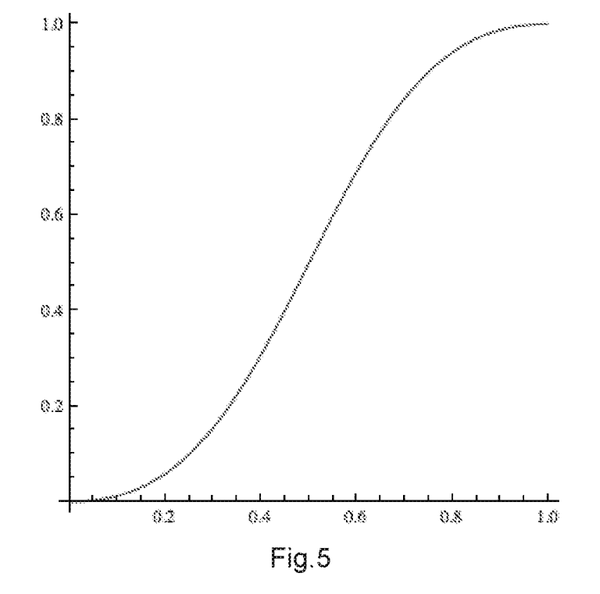
FIG. 5 illustrates a gradient function that may be used for the graduation of the reduction of contrast in the fourth step of the first embodiment of the image processing method.

Preferably, in order to smooth the reduction of contrast over the image, this reduction of local contrast is graduated from a lower reduction of local contrast for pixels of the peripheral area closer to a center of the image or to a central vertical line in the image, up to a higher reduction of local contrast for pixels of the peripheral area further to this center or to this central vertical line, namely for pixels located near the border of the image. This graduation in the reduction of local contrast may advantageously follow the curve illustrated on FIG. 5, corresponding to the following gradient function $$f_\alpha(x)=x^\alpha/(x^\alpha+(1-x)^\alpha),$$

where x is a distance separating a pixel to be filtered from the center of the image or from the central vertical line in the image, and where, for instance: $\alpha=2$.

Figure 6:
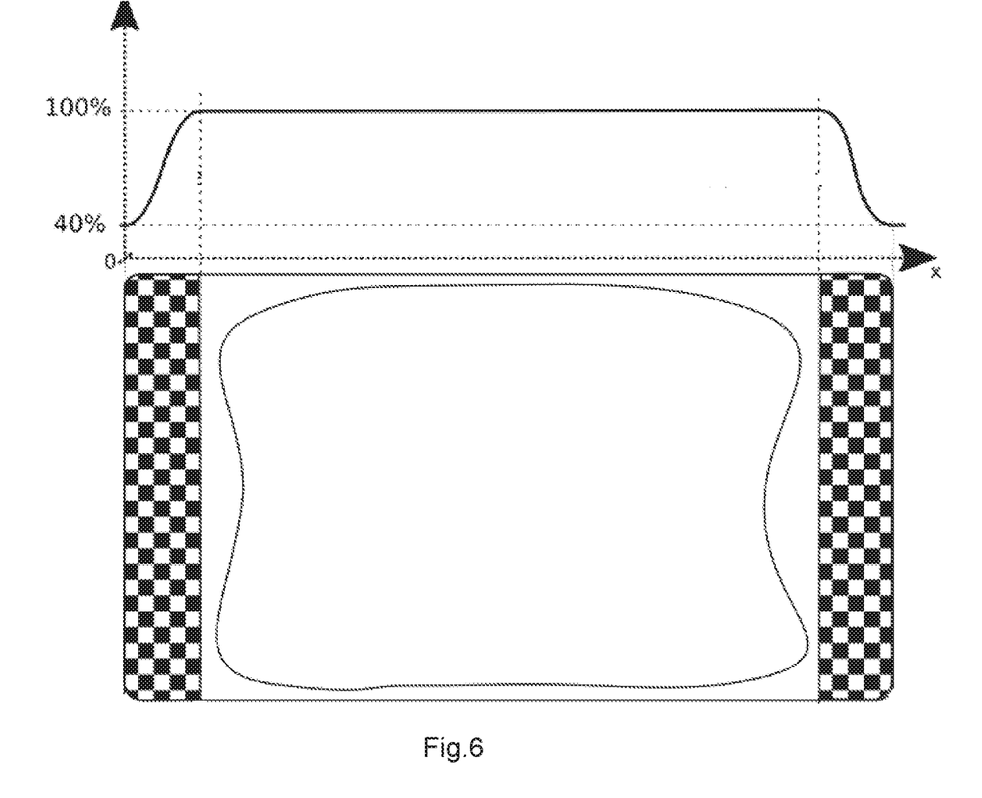
FIG. 6 illustrates the application of the gradient function of FIG. 5 for the graduation of the reduction of contrast in the left and the right peripheral zones performed in the fourth step of the first embodiment of the image processing method.

As illustrated on FIG. 6 showing rectangular peripheral areas on the left side and on the right side of the image, the highest reduction of local contrast is for instance set to 60% (i.e. 40% remaining contrast shown on the figure) for pixels of the peripheral areas located on the border of the image and the lowest reduction of local contrast is 0% (i.e. 100% remaining contrast shown on the figure) for pixels of the peripheral area(s) near the central part of the image. For all pixels of the central part of the image (i.e. defined as the area between the two opposite peripheral areas), the contrast is not changed (i.e. 100% remaining contrast). Such a gradual reduction of local contrast prevents advantageously from the creation of color artifacts in the image.

A black filtering overlayer can be built in a manner known per se such as, when applied on the image, a reduction of local contrast is obtained. Such a black filtering overlayer can be represented by a LUT.

As a variant, a histogram equalization filter can be used to get a local reduction of contrast. The advantage of such a filter is that the mean luminance of pixels of the filtered peripheral area is not changed.

As another variant, a convolutional filter can be used.

At the end of the above process, a processed image is obtained. Of course, luminance values of pixels that do not belong to the peripheral areas (i.e. that belong to a central area of the image) are generally not processed to get the processed image.

Advantageously, when displaying this image of a screen having a large size, notably a high width, no flickering will occur in the eyes of a viewer. Other images of the sequence are preferably processed using the same method.

Figure 9:
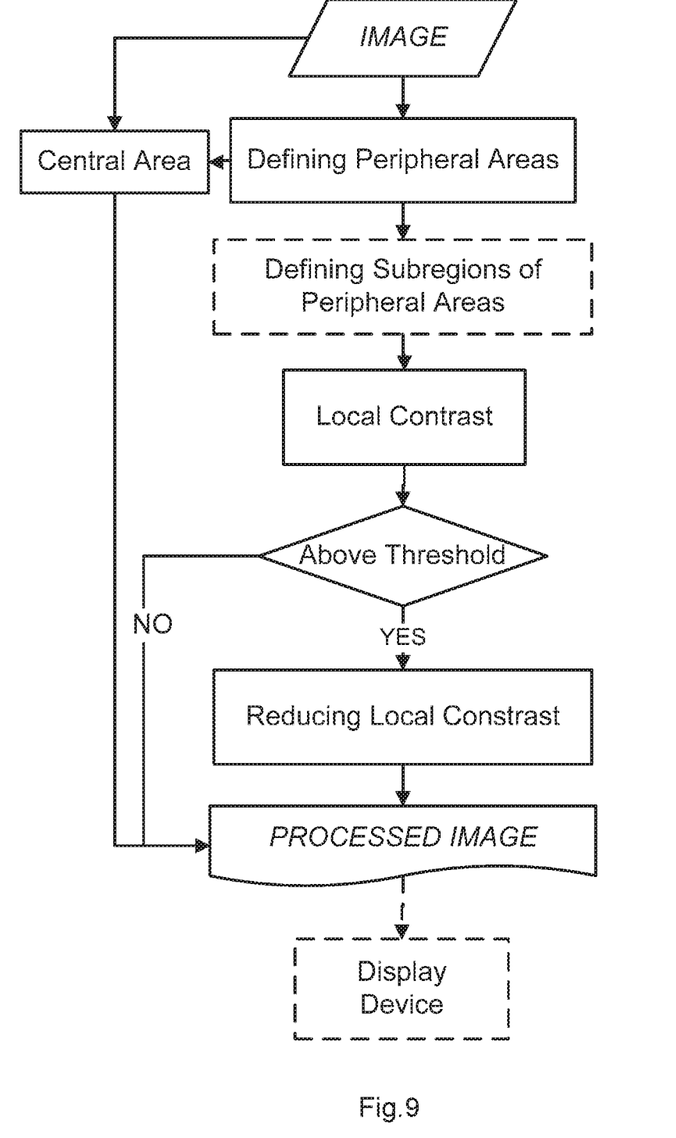
FIG. 9 illustrates a flowchart of the first and second embodiment of the image processing method.

In a second embodiment of the method for processing images of a video sequence illustrated on FIG. 9 too, the peripheral areas are divided in N subregions 1, 2, . . . , i, . . . , N.

In an example, these subregions are identical squared areas, each of then having a side for instance equal to 3.%*L, where L is the width of the image.

Then, a contrast value $R_i$ is computed for each subregion i, providing then a local contrast value for this subregion.

The local contrast $R_i$ of a subregion i is for instance based on a ratio defined as:

the difference $L_{1090}$ between the lowest luminance of the last decile of the distribution of luminance values of all pixels of this subregion and the highest luminance of the first decile of this distribution, divided by the difference $L_{100\%}$ between the highest luminance and the lowest luminance of this distribution, wherein the last decile corresponds to the highest luminance values of the distribution and the first decile corresponds to the lowest luminance values of the distribution.

In a first variant of computing local contrast of a subregion i, its local contrast $R_i$ is equal to this ratio.

In a second variant of computing local contrast in a subregion i, the local contrast is defined as $R'_i = R_i * \sigma_i$, where $\sigma_i$ is the standard deviation $\sigma_i$ of luminance values of all pixels of the subregion.

This standard deviation $\sigma_i$ can be typically computed as:

$$\sigma_i = \sqrt{\left(\sum_{j=1}^{j=N_i}(L_j-\mu_i)^2\right)/N_i}$$

where $N_i$ is the total number of pixels in the subregion i, $L_j$ is the luminance of a pixel $p_j$ of this subregion, $\mu_i$ is the average luminance over all pixels of this subregion.

Figure 7:
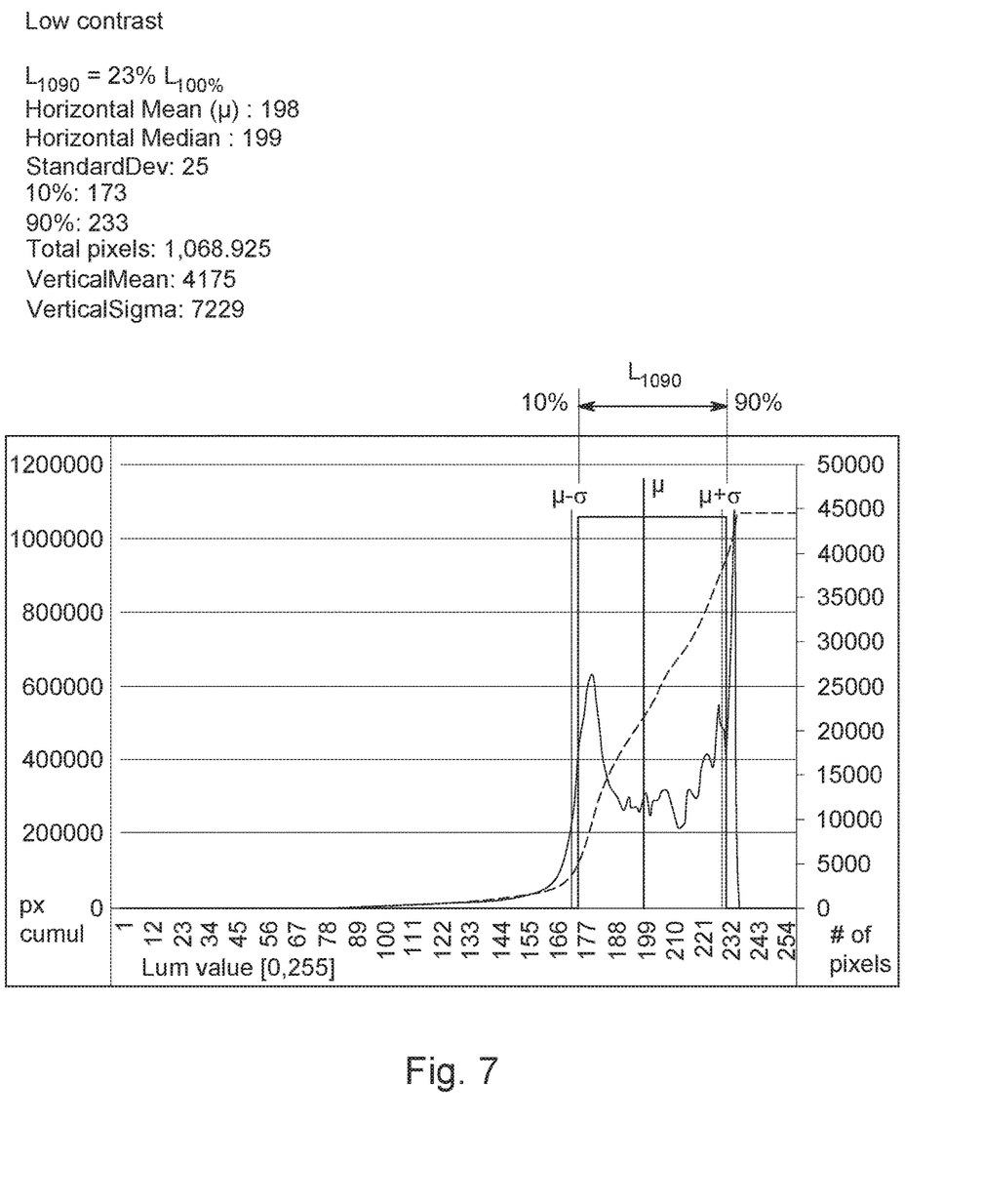
FIG. 7 illustrates the distribution of luminance values in a subregion of an image having a low local contrast, in the context of the second embodiment of the image processing method.

FIG. 7 illustrates a subregion of an image having a low contrast as $R_i=L_{1090}/L_{100\%}=(233-173)/255=23\%$ is low and as $2\sigma_i=2\times\text{"StandardDev"}/255=2\times25/255=20\%$ is low too.

Figure 8:
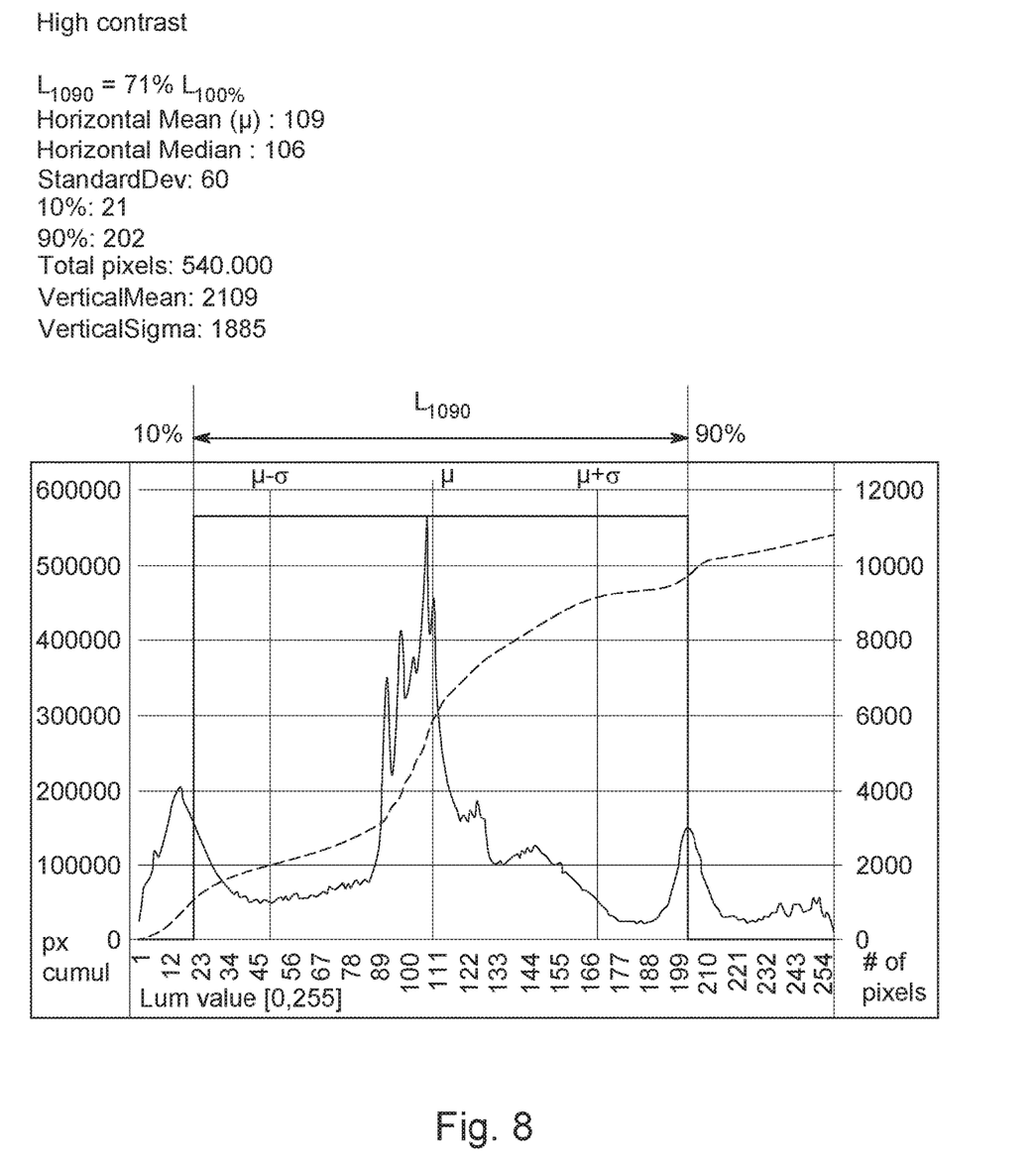
FIG. 8 illustrates the distribution of luminance values in a subregion of an image having a high local contrast, in the context of the second embodiment of the image processing method.

FIG. 8 illustrates another subregion of an image having a high contrast as $R_i=L_{1090}/L_{100\%}=(202-21)/255=71\%$ is high and as $2\sigma_i=2\times\text{"StandardDev"}/255=2\times60/255=47\%$ is high too.

In a third step of this second embodiment, local contrast values $R_i$ of each subregion i is compared to a local contrast threshold $R_{i\text{-}th}$.

In a first variant, local contrast thresholds $R_{i\text{-}th}$ are the same for all subregions i, for instance equal to 0.5.

In a second advantageous variant, the local contrast threshold $R_{i\text{-}th}$ of a subregion i is a monotonous decreasing function of a distance of a center of this subregion i from a medium vertical straight line centered on the image or from a center of this image. Such a medium vertical straight line would generally be parallel to the left and right sides of the image and would divide the image into equal parts. Thank to this variant, more a subregion is distant from the center of the image more its flickering effect is critical, and more the filtering step (see below) is triggered for a low contrast threshold.

In a fourth step of the second embodiment, the local contrast of each subregion i having a local contrast above the local contrast threshold $R_{i\text{-}th}$ of this subregion is reduced as in the fourth step of the first embodiment above. Preferably, the reduction of local contrast in a subregion is performed such that, if a pixel in this subregion has a larger luminance value than other pixels of this subregion, then the large pixel luminance value is decreased, and, if a pixel has a smaller luminance value than other pixels in the subregion, then the small pixel luminance value is increased. Preferably, such a reduction of local contrast in pixels of a subregion is proportional to distance of a center of a filtered pixel of this subregion from a medium vertical straight line centered on the image or from a center of image. Having a contrast reduction increasing with eccentricity of the subregion within the image will advantageously compensate for the known increase of Critical Flicker Frequency with retinal eccentricity.

Preferably, the filtered image which is obtained is smoothed in a manner known per se to lower any color artefacts which may have been created by the filtering of the selected subregions.

At the end of this processing, a processed image is obtained, in which colors of pixels belonging to the peripheral area are processed such as to reduce temporal and/or spatial flickering feeling by reducing light stimulation of the corresponding peripheral region of the eye, and notably to keep temporal and/or spatial flickering frequency of the content below the critical flicker frequency of the corresponding peripheral region of the eye. Of course, luminance values of pixels that do not belong to the sub-regions (i.e. that belong to a central area of the image) are generally not processed to get the processed image.

Other images of the sequence are preferably processed using the same method.

The above methods for processing images of a video sequence may be implemented in any image processing device comprising at least one processor. This image processing device may be part of a Set-Top-Box, a Gateway, a TV set, a tablet, a smartphone, a laptop, a Head-Mounted-Display, or any other electronic device. The processor is configured in a manner known per se to implement one of these image processing methods.

Although the illustrative embodiments of the image processing method have been described herein with reference to the accompanying drawings, it is to be understood that the present invention is not limited to those precise embodiments, and that various changes and modifications may be effected therein by one of ordinary skill in the pertinent art without departing from the invention. All such changes and modifications are intended to be included within the scope of the appended claims. The present invention as claimed therefore includes variations from the particular examples and preferred embodiments described herein, as will be apparent to one of skill in the art.

The invention claimed is:

1. A method for processing at least one image of a video sequence comprising:
    defining at least two peripheral areas in the at least one image,
    reducing contrast of pixels in subregions of said defined peripheral areas, wherein the subregions have a local contrast above a local contrast threshold of each subregion,
    wherein said local contrast threshold is proportional to a width of a screen of a display device used to view said at least one image, and
    wherein reducing contrast of pixels is performed such that largest pixel luminance values of said pixels are decreased and smallest pixel luminance values of said pixels are increased.

2. The method of claim 1, wherein local contrast threshold of each subregion decreases as a function of a distance of a center of this subregion from a medium vertical straight line centered on the at least one image or from a center of the at least one image.

3. The method of claim 1, wherein said peripheral areas are defined such as to be symmetrically distributed between a left part and a right part of the image.

4. The method of claim 1, wherein the local contrast of a peripheral area or of a subregion is based on a ratio defined as:
    the difference between the lowest luminance of the last decile of the distribution of luminance values of pixels of this OF subregion and the highest luminance of the first decile of this distribution, divided by the difference between the highest luminance and the lowest luminance of this distribution,
    wherein the last decile corresponds to the highest luminance values of the distribution and the first decile corresponds to the lowest luminance values of the distribution.

5. The method of claim 4, wherein the local contrast of a subregion of the at least one image is defined as said ratio multiplied by the standard deviation $\sigma_i$ of luminance values of pixels of the subregion.

6. An image processing device comprising at least one processor configured for implementing a method for processing at least one image of a video sequence, comprising:
   defining at least two peripheral areas in at least one image,
   reducing contrast of pixels in subregions of said defined peripheral areas, wherein the subregions have a local contrast above a local contrast threshold of each subregion,
   wherein said local contrast threshold is proportional to a width of a screen of a display device used to view said at least on image, and
   wherein reducing contrast of pixels is performed such that lamest pixel luminance values of said pixels are decreased and smallest pixel luminance values of said pixels are increased.

7. The image processing device of claim 6, wherein local contrast threshold of each subregion decreases as a function of a distance of a center of this subregion from a medium vertical straight line centered on the at least one image or from a center of the at least one image.

8. The image processing device of claim 6, wherein the local contrast of a subregion is based on a ratio defined as:
   the difference between the lowest luminance of the last decile of the distribution of luminance values of pixels of this subregion and the highest luminance values of the first decile of this distribution, divided by the difference between the highest luminance and the lowest luminance of this distribution,
   wherein the last decile corresponds to the highest luminance values of the distribution and the first decile corresponds to the lowest luminance values of the distribution.

9. The image processing device of claim 8, wherein the local contrast of a subregion of the at least one image is defined as said ratio multiplied by the standard deviation $\sigma_i$ of luminance values of pixels of the subregion.

10. A non-transitory computer readable storage medium comprising stored instructions that when executed by a processor performs a method for processing at least one image of a video sequence, comprising:
   defining at least two peripheral areas in at least one image,
   reducing contrast of pixels in subregions of said defined peripheral areas, wherein the subregions have a local contrast above a local contrast threshold of each subregion,
   wherein said local contrast threshold is proportional to a width of a screen of a display device used to view said at least one image, and
   wherein reducing contrast of pixels is performed such that lamest pixel luminance values of said pixels are decreased and smallest pixel luminance values of said pixels are increased.

11. The non-transitory computer readable storage medium of claim 10, wherein local contrast threshold of each subregion decreases monotonically in function of a distance of a center of this subregion from a medium vertical straight line centered on the at least one image or from a center of the at least one image.

12. The non-transitory computer readable storage medium of claim 10, wherein the local contrast of a subregion is based on a ratio defined as:
   the difference between the lowest luminance of the last decile of the distribution of luminance values of pixels of this subregion and the highest luminance values of the first decile of this distribution, divided by the difference between the highest luminance and the lowest luminance of this distribution,
   wherein the last decile corresponds to the highest luminance values of the distribution and the first decile corresponds to the lowest luminance values of the distribution.

13. The non-transitory computer readable storage medium of claim 12, wherein the local contrast of a subregion of the at least one image is defined as said ratio multiplied by the standard deviation $\sigma_i$ of luminance values of pixels of the subregion.

* * * * *

UNITED STATES PATENT AND TRADEMARK OFFICE
CERTIFICATE OF CORRECTION

| | |
|---|---|
| PATENT NO. | : 11,176,866 B2 |
| APPLICATION NO. | : 16/413550 |
| DATED | : November 16, 2021 |
| INVENTOR(S) | : Goulven Querre and Thomas Morin |

It is certified that error appears in the above-identified patent and that said Letters Patent is hereby corrected as shown below:

In the Claims

In Column 8, approx. Lines 51-52, Claim 4, delete "of a peripheral area or of a subregion" and insert --of a subregion--.

Signed and Sealed this
Twenty-first Day of February, 2023

Katherine Kelly Vidal
*Director of the United States Patent and Trademark Office*